Oct. 11, 1938.  A. LICHTE  2,132,486
CONTROL OF FLUID OPERATED PISTONS
Filed Aug. 4, 1936
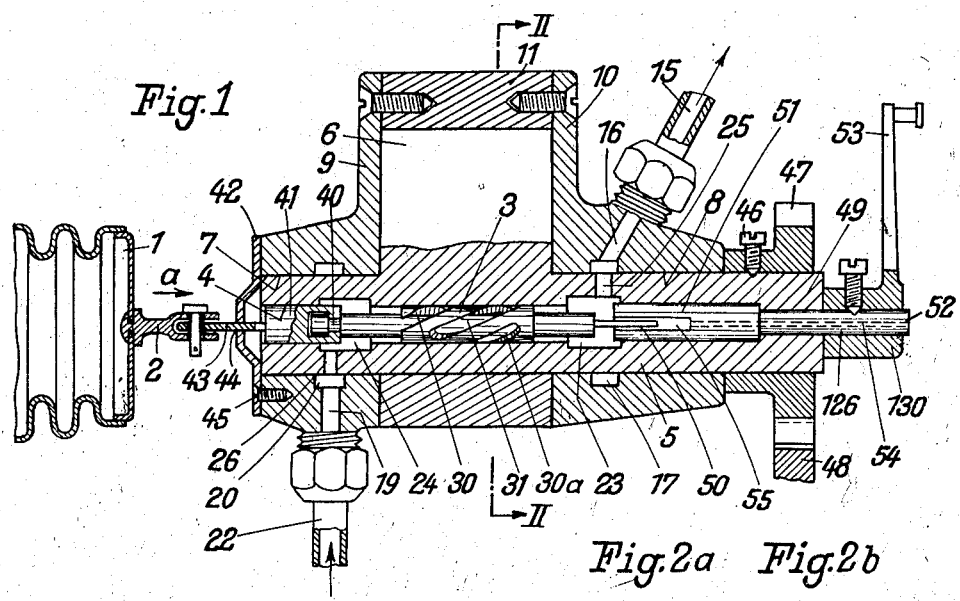
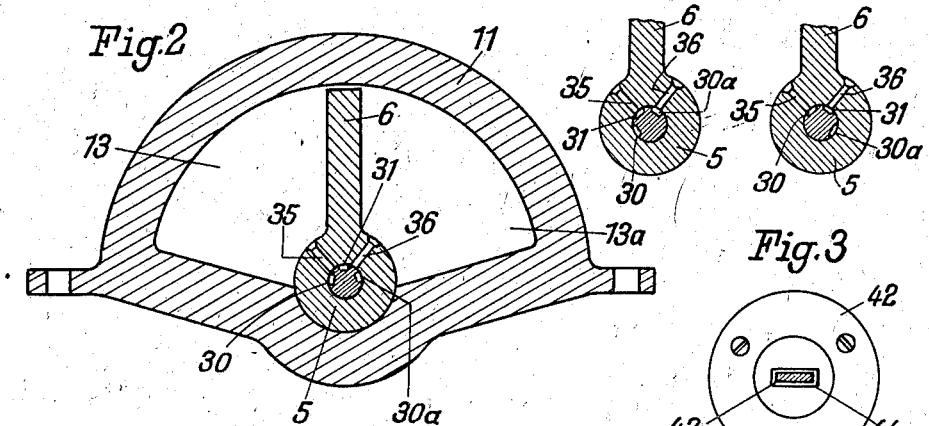
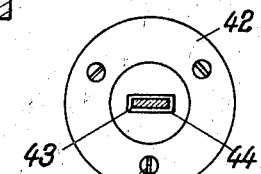
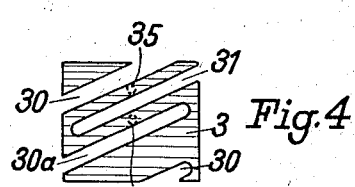
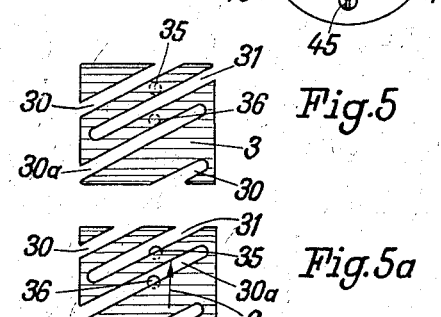
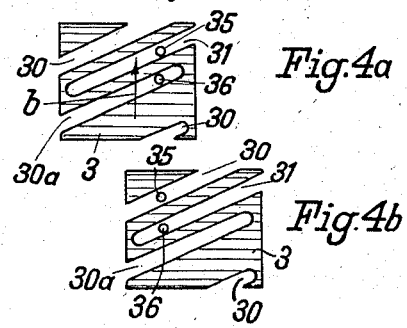
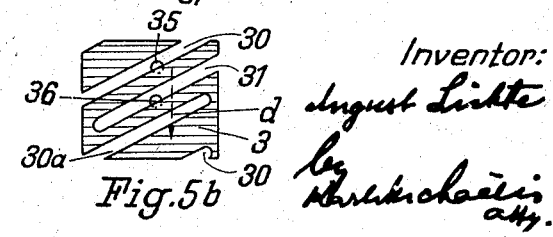
Inventor:
August Lichte Patented Oct. 11, 1938

2,132,486

UNITED STATES PATENT OFFICE 2,132,486

CONTROL OF FLUID-OPERATED PISTONS

August Lichte, Dessau-Alten, Germany, assignor to Junkers Flugzeug-und-Motorenwerke Aktiengesellschaft, Dessau-Anhalt, Germany Application August 4, 1936, Serial No. 94,179
In Germany August 22, 1935

2 Claims. (Cl. 121—41)

My invention relates to means for controlling the movement, in an engine, of a member movable under the action of a fluid, which may be a gas or a liquid under pressure. It has particular reference to the combination, with a piston acted upon by a fluid under pressure so as to be movable in a closed working space, of a member controlling the admission and exhaust of the fluid under pressure.

It is an object of my invention to provide a combination of this kind which is devoid of certain drawbacks adhering to similar mechanisms hitherto suggested.

It has already been proposed to design and arrange the control member (slide) and the power member (piston) as follows: Both members contact with each other in a cylindrical surface at least one of said members being formed with control conduits, ending in this surface, for admission and exhaust of the pressure fluid. The outlet openings of these conduits, which, on the two members being adjusted relative to each other, are either set in communication with each other or are covered and closed, are formed, at least in one of the two coacting members, as helical conduits. Relative adjustment of the two members is brought about by one of them rotating about the axis of their common cylindrical contact surface, while the other is displaced in the direction of this axis.

It is an object of my invention to so design a mechanism of the kind above described that it can be controlled by two separate and relatively independent regulating devices in such manner that the position of the power member (piston) in the power cylinder can be changed by one of the two regulating devices, without the position of the other regulating device being influenced thereby. This is effected, according to this invention, by so designing the controlling slide that it can be adjusted in two directions normal to each other, i. e. in the sense of a rotation about its longitudinal axis and further, independently therefrom, in the sense of a displacement in the direction of this axis.

A mechanism of this kind may for instance serve for regulating the admission of fuel in internal combustion engines, in which the density of the air charge is variable within wide limits, by imparting to the control member (slide) one movement by means of a regulating device influenced by the number of revolutions and which tends to keep the number of revolutions constant, while the other movement of the control member is brought about in correspondence to the density of the air charge. This can be effected for instance by means of a hand lever.

I thereby obtain that with a charge of lower density any excess of fuel and any poor combustion resulting therefrom are avoided, while at the same time the regulation to constant numbers of revolution within the admissible fuel admission is kept in full force.

In the drawing affixed to this specification an embodiment of my invention is illustrated diagrammatically by way of example.

In the drawing

Fig. 1 is an axial section showing the power member or piston under the form of a vane oscillatable, in a semi-cylindrical chamber, about the longitudinal axis of the cylinder, while the control member (slide) is capable of both a rotary and an axial movement.

Fig. 2 is a cross section on the line II—II in Fig. 1.

Figs. 2a and 2b are part cross sections of the vane forming the power piston with the slide shown in two different circumferential positions.

Fig. 3 is a partial end view and cross section of Fig. 1 viewed in the direction of the arrow a.

Figs. 4, 4a and 4b are developments of the helical conduit openings of the axially displaced slide in three different positions relative to the openings of the conduits.

Figs. 5, 5a and 5b are similar developments for rotary displacements of the slide.

Referring to the drawing and first to Fig. 1, 6 is the oscillatory piston or vane forming the power member and 11 is a segment-shaped casing with lateral extensions 9 and 10, in the borings 7 and 8 of which the spindle 5 carrying the vane 6 is supported. 3 is the slide or controlling member and 1 is a regulating device in the form of a diaphragm suffering changes of form when acted upon by different pressures, which is connected by a link 2 with an auxiliary member 41. The slide 3 is inserted for displacement in a boring 4 of the spindle 5 so as to be in contact with the piston or vane 6 in a cylindrical surface. The left hand end of slide 3 is connected, by means of a link 40, to the auxiliary member 41 in such maner that the slide and the member are capable of relative rotary movement, but are prevented from carrying out any relative axial movement. On its right hand end slide 3 is provided with a flattened extension 50 projecting into a slit 55 of another auxiliary member 51, which allows the slide and the member 51 to axially move relative to each other while preventing any relative circumferential displacement. On the projecting end 52 of member 51 is fixed a lever 53 which can be turned by hand or by means of an automatic regulating device (not shown). An exhaust pipe 15 in communication with the exhaust of fluid is connected with the extension 10 of the casing, a conduit 16 ending in an annular groove 17 establishing communication between the pipe 15 and the boring 8. To the extension 9 of the casing is connected the fluid admission pipe 22 by an annular groove 20 and a boring 19. 23 and 24 are enlarged excavations of the spindle boring 4. Each excavation communicates by a boring 25 and 26, respectively, of the spindle 5 with the annular grooves 17 and 20, respectively. In the slide are formed helical grooves 30, 30a and 31 forming controlling conduits. The grooves 30 and 30a communicate with the cavity 24, the groove 31 with the cavity 23. The spindle 5 is further formed with two radial borings 35 and 36 (Fig. 2) which end on one side in that part of the spindle boring 4 which surrounds the portion of the slide formed with the controlling edges, and on the other side in one of the two working chambers 13 and 13a, respectively, situated on either side of the vane or piston 6. The openings of the conduits 35, 36 in the wall of the spindle boring 4 are spaced, in the circumferential direction, equally as two adjoining control conduits 30 and 31 or 31 and 30a of the slide 3. On the extension 9 of the casing, which faces the diaphragm 1, is fixed by means of screws 45 a plate 42 formed with a slit 44 (Fig. 3), through which extends the flattened end 43 of the auxiliary member 41, whereby the auxiliary member is prevented from revolving about its axis. At the other end, averted from the diaphragm 1, the spindle 5 is formed with an end portion 49, on which is fixed, by means of a set screw 46, a gear wheel 47 meshing with a gear wheel 48 which is connected with the adjusting member (not shown) to be moved. The member 51 is formed with a vent 54, which connects the spindle boring 4 with the atmosphere and prevents an air cushion from forming in front of the slide.

The operation of this device is the following:

If we assume the slide 3 to be first in the position shown in Figs. 2, 4, and 5, when the parts of the wall of the slide between the helical conduits 30 and 31 or 31 and 30a cover the openings of the conduits 35 and 36 in the wall of the spindle boring 4 (Fig. 2), no fluid can enter or escape from the conduits 35 and 36 and consequently the vane 6 will remain at rest. If now the slide 3 is shifted towards the left in Fig. 1 (in the direction towards the diaphragm 1) the openings of the conduits 35 and 36 are uncovered, as shown in Figs. 2a and 4a, conduit 35 now being connected with the conduit 31 and conduit 36 with the conduit 30a. The pressure fluid now flows from the supply pipe 22 through the conduit 19, annular groove 20 and cavity 24 into the conduit 30a and (according to Figure 2a) through conduit 36 into the working space 13a on the right of the vane 6. The vane 6 is now turned by the fluid towards the left (in anti-clockwise direction). In consequence thereof the fluid in the working space 13 on the left of the vane 6 is forced through conduits 35 and 31, cavity 23, conduit 25, annular groove 17 and conduit 16 into the exhaust pipe 15. With this adjustment of the vane the openings of the conduits 35 and 36 are shifted in the direction of the arrow b in Fig. 4a obliquely to the edges of the conduits 30a, 31 and are thereby gradually covered by the wall sections intermediate the conduits. In consequence thereof the movement of the van 6 continues only until these conduit openings have been fully covered by the wall sections of the slide. Owing to the helical form of the control conduits the fresh covering of the openings will require an angle of adjustment which will be the larger, the farther the slide 3 was displaced. Thus this displacement and the oscillation of the vane are related with each other in a predetermined manner which is defined by the pitch of the helical control conduits.

A similar operation will be obtained by a turning of lever 55 which results in a rotary movement of the slide 51 relative to the vane or piston 6, without influencing the axial position of the slide. The effect of such rotary movement of the slide on the vane or piston is illustrated in Figs. 5, 5a and 5b. Fig. 5, which corresponds to Fig. 4, illustrates the state of rest, in which both the control slide and the power piston are at rest, since the openings of the conduits 35, 36 of the vane are covered by the wall sections between the helical conduit openings of the slide, whereby a flow of pressure fluid is prevented from occurring. On the other hand, if the slide is turned as shown by the arrow c in Fig. 5a, the helical conduit openings 31, 30a of the slide will communicate with the openings of the conduits 35, 36, respectively, of the vane and the fluid will now be free to flow, whereby the vane will be moved in the sense of the rotary movement of the slide (i. e. also in the direction of the arrow c in Fig. 5a), until the position of rest has been restored, in which the conduit openings 35 and 36 of the vane have again assumed the same position relative to the helical conduit openings of the slide as before rotation of the slide.

If the slide is displaced from its normal position in Figs. 1 and 4 towards the right, away from the diaphragm 1, the conduit 35 will be connected, according to Figs. 2b and 4b, with the conduit 30 and conduit 36 with conduit 31, so that now pressure fluid will flow from the fluid supply 22 through conduit 19, annular groove 20, conduit 26, cavity 24, conduits 30 and 35 into the working space 13 on the left of the vane 6. The vane will now be moved to the right (in clockwise direction) and will displace fluid from the working space 13a on the right. This fluid will flow through conduits 36 and 31, cavity 23, conduit 25, annular groove 17 and conduit 16 into the exhaust pipe 15. The same will occur on rotation of the slide 3 in the direction of the arrow d in Fig. 5b, whenever lever 53 is turned in opposite direction as described herebefore.

I wish it to be understood that I do not desire to be limited to the exact details of construction shown and described for obvious modifications will occur to a person skilled in the art.

I claim:

1. A mechanism for moving a power member acted upon by a fluid under pressure in dependency from the movements of a control member serving to control the admission and exhaust of the fluid, comprising in combination, a power member, a closed working space enclosing said power member, a member arranged to follow the movements of said power member, a control member contacting with said power member in a cylindrical surface, helical flow-controlling conduits in said surface of contact, two regulating devices independent from each other, means connected with one regulating device for turning the control member about its longitudinal axis, and means connected with the other regulating device for displacing the control member in the axial direction.

2. A mechanism for moving a power member acted upon by a fluid under pressure in dependency from the movements of a control member serving to control the admission and exhaust of the fluid, comprising in combination a substantially semicylindrical casing, a vane extending axially across said casing and arranged for oscillation about its axis, a hub formed on said vane, a control slide extending through an axial boring of said hub, said slide being arranged turnable and axially displaceable in said boring, means for admitting pressure fluid to and means for exhausting pressure fluid from such boring, helical flow-controlling conduits in one of the surfaces, in which said slide and said hub contact with each other, and automatically active means for operating said slide.

AUGUST LICHTE.